United States Patent

Herterich et al.

[11] 4,029,328
[45] June 14, 1977

[54] AUXILIARY TRANSPORTING DEVICE

[75] Inventors: Walter Herterich, Dachau; Georg Probst, Munich, both of Germany

[73] Assignee: Ecofon Verkaufsgesellschaft Probst KG., Munich, Germany

[22] Filed: Sept. 4, 1975

[21] Appl. No.: 610,146

[30] Foreign Application Priority Data

Sept. 9, 1974 Germany .......................... 2443042

[52] U.S. Cl. .......................... 280/47.24; 280/179 R
[51] Int. Cl.² .......................................... B62B 1/06
[58] Field of Search ............ 280/47.13 R, 47.13 B, 280/35, 47.24, 638, 179 R; 214/377, 378, 379; 248/316 A; 269/147, 148, 149

[56] References Cited

UNITED STATES PATENTS

| 1,099,933 | 6/1914 | Pohrer | 280/47.17 |
| 1,272,259 | 7/1918 | Herold | 269/149 X |
| 2,598,831 | 6/1952 | Ramey | 280/35 |
| 2,919,138 | 12/1959 | Bower et al. | 280/47.13 X |

FOREIGN PATENTS OR APPLICATIONS

| 205,413 | 2/1959 | Austria | 280/35 |
| 857,678 | 9/1940 | France | 280/47.24 |
| 20,055AD | 1901 | United Kingdom | 280/35 |

Primary Examiner—Joseph F. Peters, Jr.
Assistant Examiner—John A. Pekar
Attorney, Agent, or Firm—Woodhams, Blanchard and Flynn

[57] ABSTRACT

A device for moving objects that are normally temporarily used, such objects being, for example, furniture or the like used on beaches. The device is composed of an elongated shaft having a pair of wheels mounted on opposite ends thereof. A pair of blocks are axially slidably movable on the shaft and have a receiving groove therein for receiving a projection on the object which is to be transported. As a result, the object can be placed between the pair of blocks and the blocks adjusted to engage the peripheral edges of the object to clamp the object therebetween. Thereafter, the article can be transported on the wheels to the desired location.

5 Claims, 2 Drawing Figures

AUXILIARY TRANSPORTING DEVICE

FIELD OF THE INVENTION

The invention relates to a device for the temporary moving of normally stationary articles, preferably collapsible beds.

BACKGROUND OF THE INVENTION

One must often transport articles for a short period of time, which articles are then used stationarily at a certain place. For example, collapsible beach beds and other swimming articles must be carried from a car parking lot to the beach, which is a most tiring and complicated process.

The purpose of the invention is to reduce the amount of work involved in transporting articles which are used only for relatively short periods of time and to produce a simple and effective transporting device. This purpose is attained inventively by providing at least one shaft having wheels mounted on both ends thereof, by movably arranging on said shaft two blocks against the urging of a tension spring, and by providing each block with a receiving groove receiving a projection of the article to be moved such that the article can be clamped between the receiving grooves of both blocks and can be moved on the wheels. During the transporting process, the article is thus releasably connected with at least one wheeled support and is then rolled to the destination with a minimum of work being involved. Of course, it is possible to place further articles onto the article equipped with wheels and to transport these as well. It is particularly advantageous, due to the movability pf the blocks axially relative to the shaft, to transport articles of various dimensions with the help of one wheeled support, from which results a broad possibility of expanded use. It is left up to the operator, to release the auxiliarily used wheeled support during the stationary use of the article or to leave the wheeled support on the article. Moreover, it is possible, in the case of particularly bulky or large articles, to mount two wheeled supports on said articles and thus move the entire load on four wheels.

In a preferred embodiment of the invention a pull rod or the like is provided, which on one side is anchored to the shaft and on the other end is equipped with a handle. This pull rod can also be adjustable in its length. With the help of such a rod, the article which is coupled with the wheeled support and the additional articles possibly placed thereon can be pulled by the operator during the transporting function. Furthermore, such a rod is preferably used for balancing the wheeled support by the operator.

According to a different characteristic of the invention, it is advantageous to construct the receiving groove in the block wedge-shaped in cross section. In this manner, it is possible to receive in the groove different sized projections on the article to clamp beds having various tube diameters without any difficulty for transporting purposes.

According to a further characteristic of the invention, it is particularly advantageous to provide between the outer surface of the shaft and the inner diameter of a hole in each block, which hole receives the shaft, a large clearance space so that the block under the urging of a tension spring can be positioned inclined on the shaft and become self-locked thereon. Through this, the clamped article is securely held in the clamped position on the shaft of the wheeled support.

In a particularly advantageous embodiment of the invention, each wheel is mounted on the shaft by means of an easily releasable connection. In this manner, the wheeled support can be disassembled into individual parts, which for example can be easily stored in the car and, if necessary, can be assembled quickly for transport.

BRIEF DESCRIPTION OF THE DRAWING

One exemplary embodiment of the invention will be discussed more in detail in the following description in connection with one drawing, in which.

DETAILED DESCRIPTION

Figure 1:
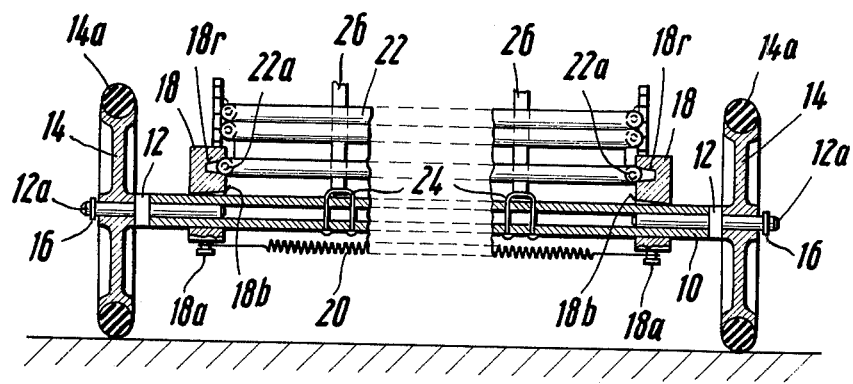
FIG. 1 is a cross-sectional view of the transport auxiliary device.

The device has an elongated hollow shaft, for example, a metal pipe 10, into which at both ends are bearing pins 12 pressfitted therein. A wheel 14 is mounted on the free end 12a of each bearing pin 12 and is secured in its axial position by an easily releasable snap ring 16 or the like. The wheels 14 have on their periphery, for example, rubber tires 14a of the conventional type.

Two identical blocks 18, which are for example made of plastic, are arranged axially movably on the shaft 10 and have a tension spring 20 extending therebetween and anchored on pins 18a on the bottom of both of the blocks 18. A hole 18b in each block 18 is larger in inside diameter than the outer diameter of the shaft 10, so that between the shaft 10 and the block 18 there exists a large clearance. Due to the pulling action of the tension spring 20, the axis of the holes 18b in the blocks 18 become inclined with respect to the axis of the shaft 10, which causes an engagement of the upper and lower portions of the inner diameter of the holes 18b with the outer surface of the shaft 10.

Each block 18 has a wedge-shaped groove 18r therein, which receives a projection on the article intended for transport. In the illustrated embodiment, the projection is formed by a piece of tubing 22a of a collapsible bed 22, which tubing functions as a leg for the bed.

Also two clamps 24 are secured on the shaft 10, to which clamps the ends of one or two pull rods 26 are anchored. Each rod has also a handle 28 thereon which can be adjusted in length.

Prior to the transporting function, the blocks 18 are pulled apart manually against the action of the tension spring 20 on the shaft 10 and one tube 22a on each side of the bed 22 is placed into the receiving groove 18r of each block 18, as this is shown in FIG. 1. After freeing the blocks 18, the bed 22 becomes clamped under the action of the spring 20 between the two blocks 18 and is held on the shaft 10. Since the blocks become slightly inclined on the shaft 10, the blocks become clamped on the shaft 10 and thus the bed is firmly secured on the wheeled support 10, 14.

Figure 2:
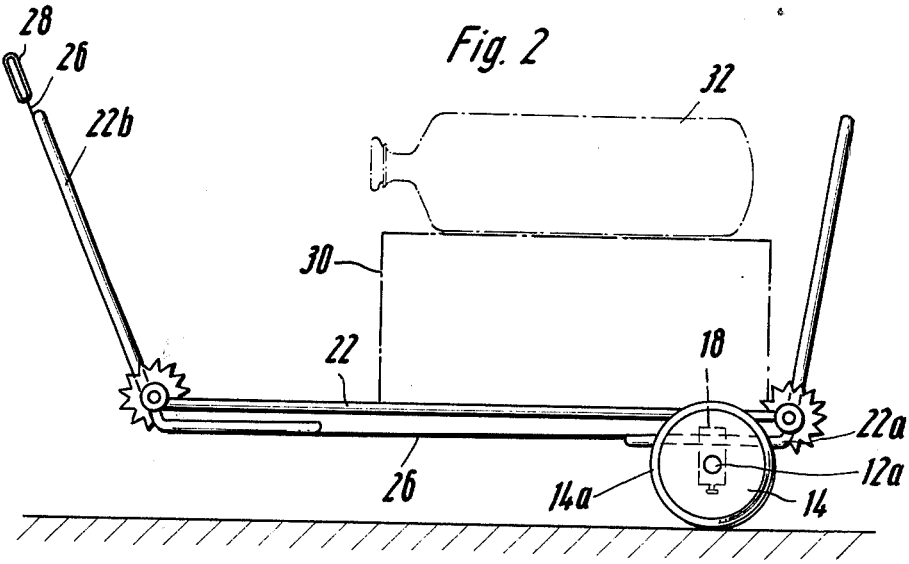
FIG. 2 illustrates the device in transport position and in a reduced scale.

After the wheeled support 10, 14 becomes connected to the bed 22, further utensils can be placed onto the clamped bed 22, for example a cooler 30 and a sack 32. With the help of the pull rod 26 and the handle 28, the operator can lift the articles designated for transport by gripping the handle and can easily transport the articles by moving the wheeled support 10, 14, as is shown in FIG. 2.

In addition, one can also fold up a member 22b of the bed 22 in direction of the handle 28 and by directly gripping said member one can also effect a movement of the wheeled support. Furthermore, one can connect two wheeled supports 10, 14 to the bed 22, so that a transport will occur on four wheels instead of two wheels.

It is possible to keep, after the transporting function and during use of the bed on the beach, the wheeled support 10, 14 clamped on said bed, or by pulling the blocks 18 apart, the wheeled support can be released from said bed. To make operation easier, it is also possible to make the pins 18a of the blocks 18 larger and to use same as a foot support. As a result, the user can clamp or release the bed prior to or after the transporting function by operating the blocks 18 with his foot.

It is possible to release the wheels 14 from the shaft 10 by easly removing the safety rings 16 and then store the individual parts 10 and 14 compactly in the car. The assembly of the individual parts of the wheeled support to the auxiliary transporting device can be carried out quickly and in an uncomplicated manner.

In conclusion, it is also mentioned that it would be possible to mount the article to be transported, contrary to the illustrated examplary embodiment, between the two blocks 18 also without the need of a tension spring 20. In this case, each block 18 would have to be equipped with a locking setscrew or the like which can be operated manually to effect a tightening of the block 18 on the shaft 10 in the clamped position of the article.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for the temporary moving of stationary articles, comprising at least one shaft having wheels mounted on both ends thereof, two blocks axially movably arranged on said shaft, each of said blocks having a receiving groove therein for receiving a projection on said article which is to be moved such that said article can be clamped between the receiving grooves in both blocks and can be moved on said wheels, a tension spring anchored between said two blocks, and between the shaft and a hole in each block receiving said shaft therein, there is provided a large clearance, so that the blocks can be positioned inclined for self-locking under the action of said tension spring on the shaft.

2. A device according to claim 1, wherein a pull rod is anchored on one end to the shaft and has on the other end a handle.

3. A device according to claim 2, wherein the length of the pull rod can be adjusted.

4. A device according to claim 1, wherein the receiving groove in the blocks is constructed wedge-shaped in cross section.

5. A device according to claim 1, wherein each wheel is mounted on the axis by means of an easily releasable connection.

* * * * *